United States Patent [19]

Jones et al.

[11] 4,060,791
[45] Nov. 29, 1977

[54] IMAGING SYSTEM

[75] Inventors: Charles H. Jones, Murrysville, Pa.; Dale D. Skinner, Severna Park, Md.

[73] Assignee: Westinghouse Electric Corporation, Pittsburgh, Pa.

[21] Appl. No.: 736,294

[22] Filed: Oct. 28, 1976

Related U.S. Application Data

[63] Continuation of Ser. No. 570,695, April 23, 1975, abandoned.

[51] Int. Cl.² .......................... G01S 9/68; G01S 7/62; G01S 7/06
[52] U.S. Cl. ............................. 340/3 C; 340/5 MP; 343/5 CD; 343/17; 358/112
[58] Field of Search ................. 340/1 R, 3 C, 5 MP, 340/6 S, 7 R; 343/5 CD, 17; 356/5, 141, 152; 178/7.3 D, 7.5 D, DIG. 18; 358/110, 112

[56] References Cited

U.S. PATENT DOCUMENTS

| 2,837,728 | 6/1958 | Schuck | 340/6 S |
|---|---|---|---|
| 3,134,975 | 5/1964 | Goodman | 343/5 CD |
| 3,784,805 | 1/1974 | Rolle | 340/5 MP |

Primary Examiner—Richard A. Farley
Attorney, Agent, or Firm—D. Schron

[57] ABSTRACT

An energy imaging system providing high resolution at the center of the field of view and reduced resolution as a function of the distance away from the center.

12 Claims, 19 Drawing Figures

IMAGING SYSTEM

This is a continuation of application Ser. No. 570,695 filed Apr. 23, 1975, now abandoned.

BACKGROUND OF THE INVENTION

1. Field of the Invention

The invention relates to imaging systems of the type wherein energy from a target area is processed and displayed to portray a picture of the target area.

2. Description of the Prior Art

Imaging systems, such as may be used in the sonar, laser or radar fields, generally include a transmitter which illuminates a certain field of view including a target area of interest. The apparatus includes a plurality of receiving elements either arranged in a predetermined matrix array, or arranged on a movable arm for covering a large area with a reduced number of elements. Reflected energy received by the elements is suitably processed to yield a display of the target area. In many instances the apparatus includes a lens for focusing reflected energy onto the receiving elements.

In order to provide the necessary signals for a display, the output of each receiving element is processed in respective signal processing channels and even with the use of a movable arm arrangement, upon which the receiving elements are mounted, a large number of elements is required for obtaining a high resolution display. In addition, the greater the number of elements, the greater will be the number of signal processing channels and other associated hardware required.

SUMMARY OF THE INVENTION

The present invention reduces the hardware requirements in an arrangement which simulates the human eye. That is, the apparatus of the present invention provides for high resolution at the center of field of view and reduced resolution as a function of the distance away from the center.

This is accomplished with the provision of a plurality of receiving elements which are positioned relative to one another to provide for this variable resolution and which receive energy from a field of view to provide corresponding output signals. These signals are processed and displayed as a picture of the field of view.

BRIEF DESCRIPTION OF THE DRAWINGS

FIG. 8A to 8D serve to illustrate the concept of circumferential interlacing;

DESCRIPTION OF THE PREFERRED EMBODIMENT

Figure 1:
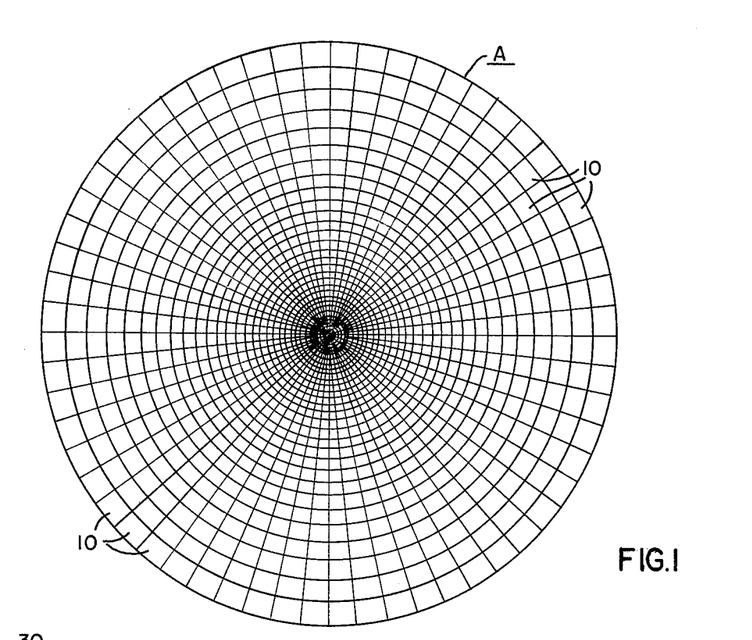
FIG. 1 illustrates a target area imaged by one embodiment of the present invention.

FIG. 1 depicts a target region under investigation in a circular scan system to be described. The target area A is comprised of a plurality of elemental resolution areas 10 and over the field of view, the distance between adjacent elemental areas is non-uniform. More particularly, the distance between elemental areas, as measured from their centers is substantially uniform in the center of the field of view but gradually increases as the radial distance from the center increases.

By way of example, for the system to be described, typical parameters may be as follows: For a target range of 30 feet (914.4 cm.) the target diameter would be 150 inches (381 cm.). Along any one radius there are 31 elemental resolution areas with the radial resolution at the center being 1 inch (2.54 cm.) for 11 such areas, with the radial dimension gradually increasing out to the edge area having a radial dimension of 7 inches (17.78 cm.). Circumferential resolution at the center would be 1 inch (2.54 cm.) and at the circumference would be 8 inches (20.32 cm.). There are 60 resolution areas circumferentially arranged, in 6° segments.

Figure 2:
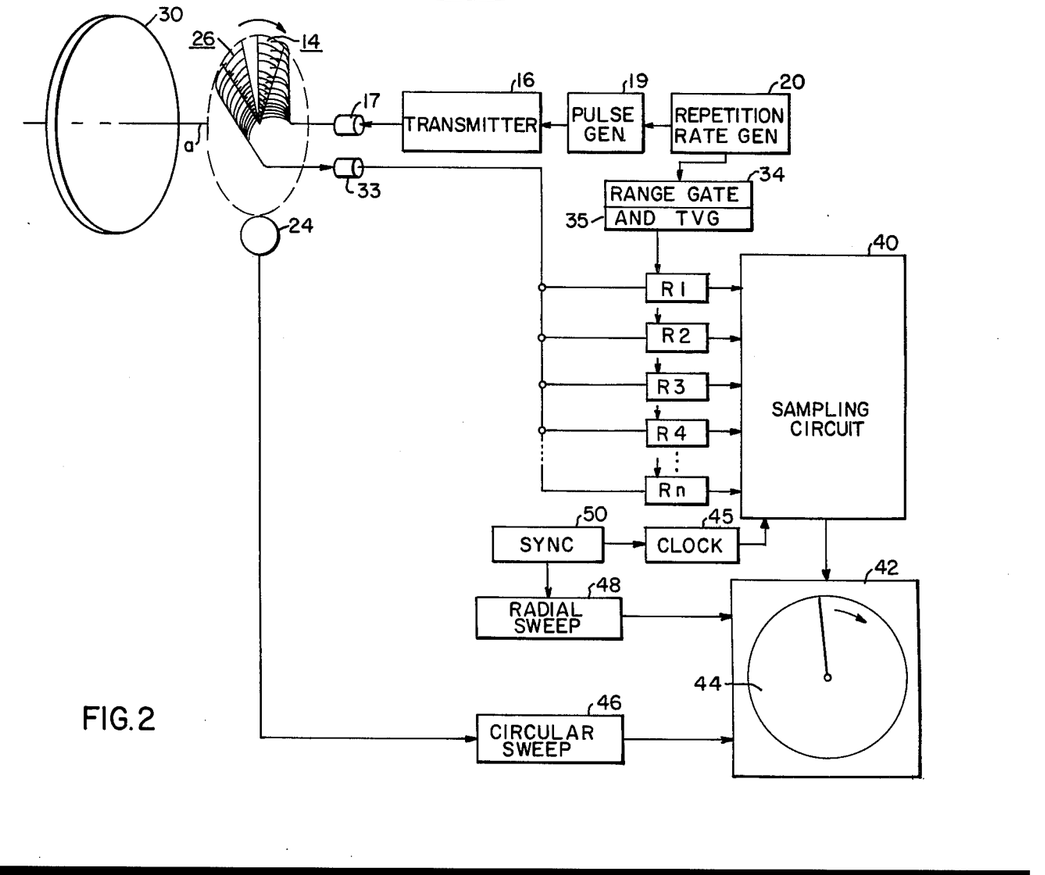
FIG. 2 illustrates, in block diagram form, one embodiment of the present invention.

FIG. 2 illustrates in block diagram form, one embodiment of the present invention for obtaining information contained in elemental resolution areas as described in FIG. 1. Basically, transmitter means are provided to cause insonification of a target area to be viewed. Energy reflected from the target area is detected by a set of receiving transducers each providing a respective output signal in accordance with the received energy. These output signals are processed, sampled and provided to a display means. The spacing of the receiving transducers is such as to provide a display having relatively high resolution in the center thereof with the resolution decreasing toward the periphery thereof, as in FIG. 1.

In order to conserve hardware, the receiving transducers are arranged on a carrier such as a rotating arm so that only 31 transducers and associated channels therefor are required, as opposed to 1545 which would be required to cover the same area, with a fixed array of transducer elements.

The means for insonifying the target area include a transmitting transducer array 14 which receives periodic energy from a transmitter 16 through rotatable coupling 17. A pulse generator 19 governs the turning on and off of the transmitter 16 in accordance with a signal from the repetition rate generator 20. The transmitting transducer array 14 is mounted on a carrier and is rotated at a constant speed around axis $a$ by means of rotational drive 24.

A receiving transducer array 26 is angularly displaced, in the present example by 6 degrees, behind the transmitting transducer array 14 and is also driven at a constant speed around axis $a$ by the rotational drive 24.

In order to focus transmitted energy onto the target area and to focus reflected energy onto the receiving transducer array 26, there is provided a lens 30.

Let it be assumed in the present example that the system is an acoustic energy system for use underwater and accordingly the lens 30 may be a conventional polystyrene acoustic lens with a diameter of 7.4 inches (18.8 cm.) and a focal length of 15 inches (38.1 cm.) so that energy from a radial sector of elemental resolution areas at the target range of 30 ft. will be focused onto respective rotating transducers of the receiving transducer array 26. The output signals of these transducers are provided through rotatable coupling 33 to respective signal processing receiver channels each including means for amplifying and detecting the received signals. The receiver channels are designated R1 to Rn where $n$ in the present example would be 31. A range gate 34 is also provided in this unit so that only signals from desired ranges are amplified. In order to compensate for variation in signal strength due to differences in range, there is provided a time varying gain circuit 35 which in response to each transmission and enabling by the range gate 34, will provide its time varying gain signal to all of the channels R1 to Rn.

For the acoustic example, the transmitter 16 may have a frequency of 3 megahertz and the transmitted pulse width, governed by the pulse generator 19 may be 33.3 microseconds in order to achieve one inch range resolution. For a repetition rate of 83 hertz, and a transducer array revolution every 0.722 seconds, 60 pulses would be transmitted during each revolution, corresponding to the 60 radial, 6° segments, on the target area.

If the equipment is to operate only at one specified range, then the transmitting and receiving transducer array may be fixed with respect to one another and may even be mounted on a common carrier in the form of a disk. However, if the equipment is to operate well over a wide spectrum of ranges, then it is desirable to be able to vary the angular separation between the transmitting and receiving transducer arrays or to vary their rotational speed. In some cases it may also be appropriate to vary the pulse repetition rate.

Each signal processing receiver channel provides a respective output signal indicative of a particular elemental resolution area. A sampling circuit 40 is therefore provided to scan, or sample these output signals for presentation to a display 42. The display 42 may include a conventional long persistance phosphor cathode ray tube (CRT) the face of which is indicated at 44. The scanning of the cathode ray beam is similar to the scan utilized in a plan position indicator (PPI) in that the radially sweeping cathode ray beam is scanned circumferentially. In order that the circumferential scanning be in synchronism with the scanning of the receiving transducer array 26, the circular sweep circuit 46 which provides the signals for the circumferential scan, is in turn provided with a synchronizing signal from the rotational drive 24.

The radial sweep of the cathode ray beam is controlled by a radial sweep circuit 48 which receives synchronizing signals from the sync circuit 50. Since the output signals from the signal processing receiver channels are displayed radially adjacent one another in one radial sweep, the sync circuit 50 additionally provides an output signal to the clock 45 governing the sampling rate. Since the circular sweep is locked to the rotational drive 24, the frequency of circular sweep will be 1.38 rps. The radial sweep frequency may be 83 Hz (12 ms period) and the sampling rate may be 3 kHz. With these frequencies each channel will be sampled for ⅓ ms and the total time required to sample all 31 channels will be 10.3 ms which leaves 1.7 ms for retrace time.

Figure 3:
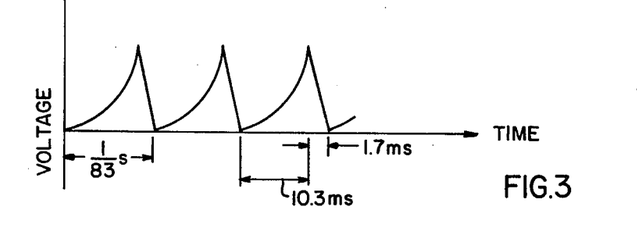
FIG. 3 illustrates a waveform utilized for the radial sweep of the cathode ray beam of the display in FIG. 2.

It will be remembered that the resolution in the center of the display is greater than at the periphery thereof. Accordingly the radial sweep may be non-linear as illustrated in FIG. 3 wherein the sweep of the cathode ray beam is faster toward the end of the sweep than the initial portion of the sweep. Alternatively the sweep may be linear and the sampling circuit 40 may be designed to sample at a non-uniform rate for proper portrayal.

Figure 4:
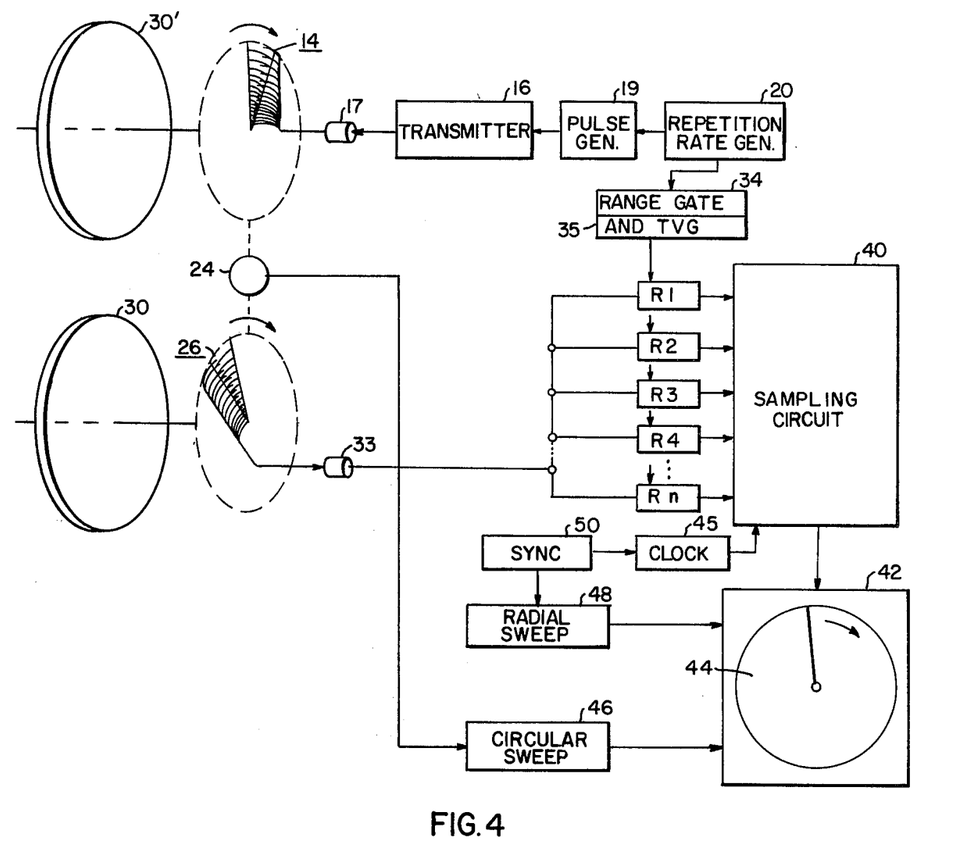
FIG. 4 is similar to FIG. 2, however illustrating an alternate lens arrangement.

In the present example the angular separation between the transmitting transducer 14 and receiving transducer array 26 is 6°. This is a relatively small angle and for the circular scan system there is an overlap problem near the axis of the device between the transmitting and receiving transducer arrays. This problem can be handled in a number of ways. One way is to eliminate a few elements near the axis thus causing a dead area, analogous to the optic disc or blind spot in the human eye. If the entire display is required however, a set of common elements can be used for both transmission and reception in the vicinity of the axis. Another solution is illustrated in FIG. 4 which is similar to FIG. 2 and includes like reference numerals for like components, and additionally includes a second lens. Lens 30' is positioned in front of the transmitting transducer array 14 and lens 30 is positioned in front of the receiving transducer array 26, with the rotational drive 24 controlling the rotation of both arrays. There will be an angular separation of 6° between transmitting, and receiving arrays, which can be varied as required for operation at different ranges.

For various operational considerations, the lens for the transmitting array may be completely eliminated with the apparatus designed to insonify the entire target area or at least a portion thereof encompassing the radial segment viewed by the receiving transducer array.

Figure 5:
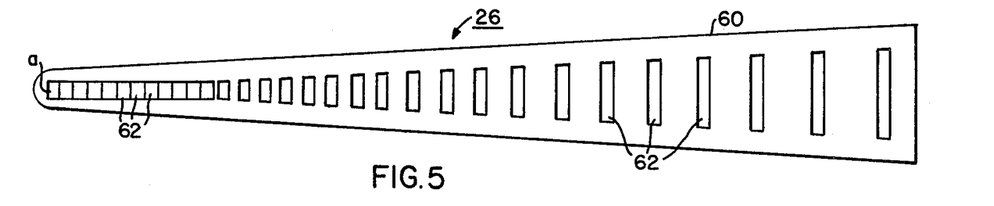
FIG. 5 illustrates a receiving transducer array utilized in the present invention.

The receiving transducer array is made up of separate transducers spaced according to the desired variable resolution. One type of arrangement is illustrated in FIG. 5. The receiving transducer array 26 includes a rotatable arm assembly 60 having positioned thereon a plurality of transducers 62. The first 11 of these transducers closest to the axis $a$ are of uniform radial width and uniform circumferential width. The remainder of the transducers are of uniform radial width but subtend an angle of 6° with the spacing between adjacent transducers increasing as the radial distance of the element increases. Alternately the elements could have a variable radial width proportional to their radial location.

Figure 6:
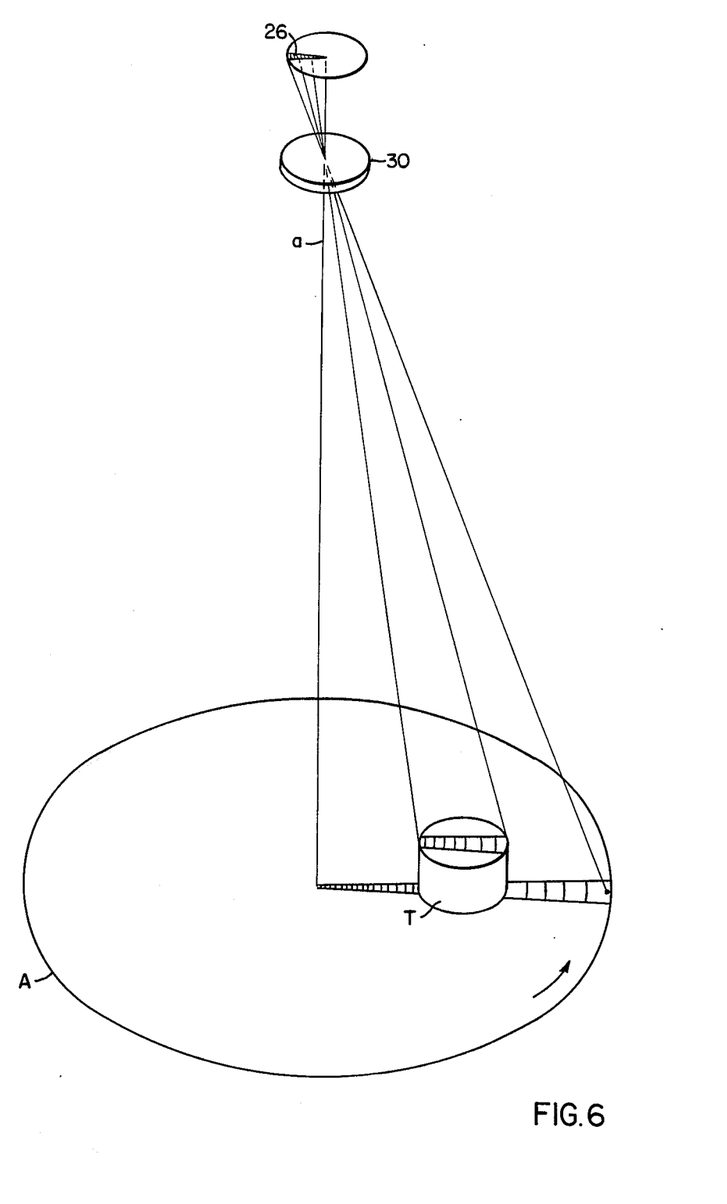
FIG. 6 depicts the reception of acoustic energy from a target in the target area, by the receiving transducer array of FIG. 2.
Figure 7:
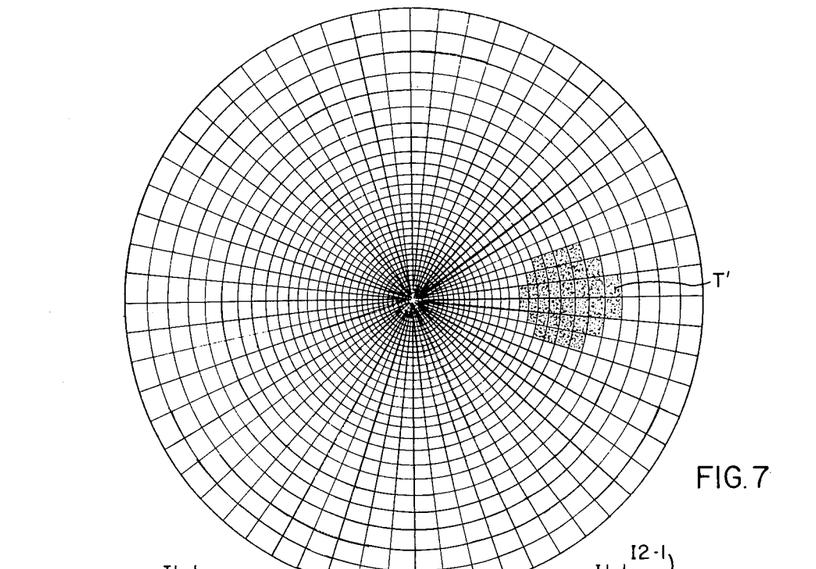
FIG. 7 illustrates the corresponding display for the target of FIG. 6.

FIG. 6 depicts the reception of acoustic energy from individual resolution areas by the receiving transducer array 26. The target area A on the sea bottom includes a target T, the acoustic returns from which are much stronger than from the sea bottom. The radial sector of elemental resolution areas is shown at one instant of circular sweep. In accordance with the present invention, such target T would appear on the display, as depicted in FIG. 7 as T' highlighted by the greater intensity of the sweeping cathode ray beam on the PPI type of display. Target detection is made, however, with slight distortion in the display due to size of elements. By redirecting the apparatus so that an object of interest falls in the center area a more detailed image can be obtained.

In many practical situations there is often some relative motion between the apparatus and the target object being imaged.

When higher resolution is obtained by using more radial elements and more circumferential positions, it takes longer to complete a 360° scan. Consequently there may be some relative motion between the apparatus and the target object being imaged before a complete picture is scanned. Consequently a circumferential interlace is desirable. Such an interlace can be employed with the present system by increasing the angular velocity of the receiving transducer array, and if a transmitting transducer array is also used, as in FIG. 2, the angular separation between them may be increased. The advantage of such arrangement is that a low definition field would be obtained quickly and two or more low definition fields will combine to yield a high resolution picture.

Figure 8A:
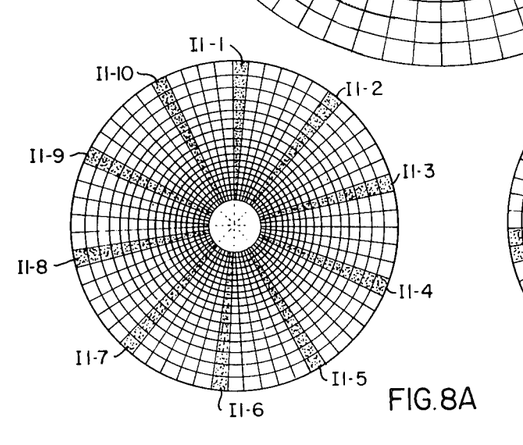
Figure 8C:
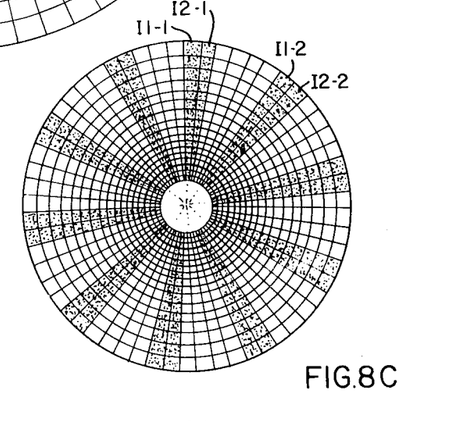
Figure 8D:
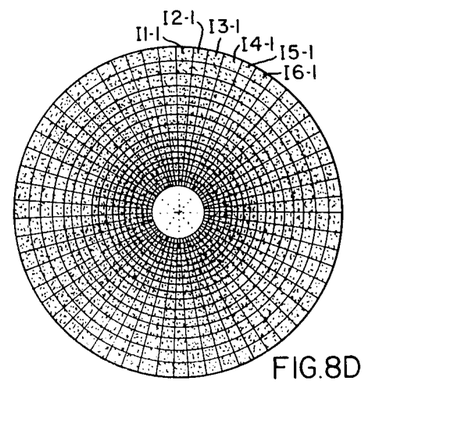

In order to achieve a desired interlace with a constant angular velocity of the radial transducer array, the relationship between the pulse period and the rotational period must be carefully chosen. By way of example, FIGS. 8A to 8D illustrate a six to one interlace with an angular resolution of approximately 6.1° resulting in 59 resolution elements in 360°. If the pulse repetition rate is 83 Hz then the time required to obtain an entire picture is 0.71 seconds, and a low resolution picture as illustrated by the shaded segments I1-1 to I1-10 in FIG. 8A is obtained after 0.118 seconds. The rotational speed of the transducer array as well as the circular scan are increased six times. The shaded portions I1-1 to I1-10 of FIG. 8A depict the writing of the cathode ray beam, with target information, on the display at those selected positions illustrated. A new shaded portion occurs 6 sectors after the last written sector, and accordingly on the second scan the cathode ray beam sweeps out an area I2-1 adjacent to shaded area I1-1 and adjacent to every shaded area written in the first scan. FIG. 8A illustrates the area scanned in a time $T_{F/6}$, where $T_F$ is the total frame period, and FIG. 8B illustrates the area scanned in $T_{F/3}$. FIG. 8C illustrates the third sectors I3-1 to I3-10 written adjacent those of FIG. 8B and is the area scanned in the $T_{F/2}$, and 8D illustrates the entire picture scanned in the total frame period $T_F$.

Figure 9:
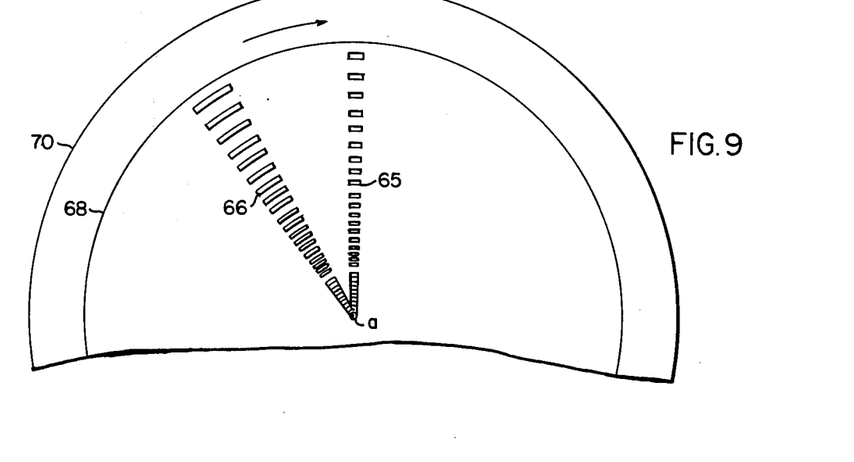
FIG. 9 illustrates a relative orientation of transmitting and receiving transducer arrays for an interlacing operation.

In the interlace operation, a transmitting transducer array may be used in conjunction with a receiving transducer array with less problem of overlap as in FIG. 2 because of the larger angle between arrays. FIG. 9 illustrates a set of transmitting transducers 65 and a set of receiving transducers 66 conveniently mounted on a common rotating disk 68 positioned behind a lens 70.

Figure 10A:
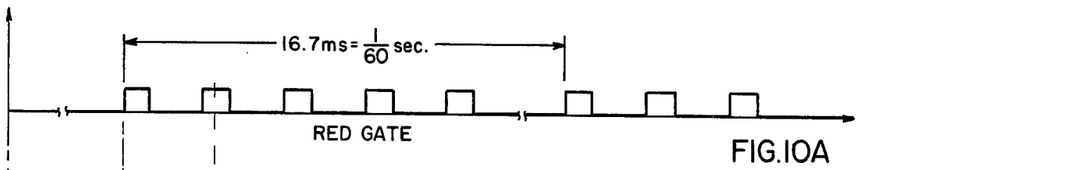
FIGS. 10A through 10E are waveforms to illustrate the operation of the present invention for a color ranging display.
Figure 10B:
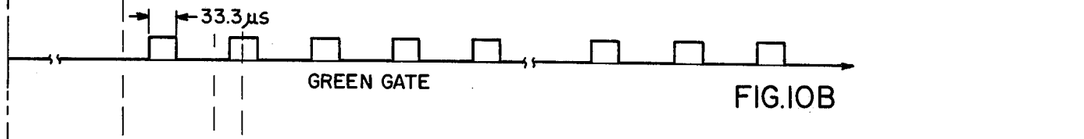
Figure 10C:
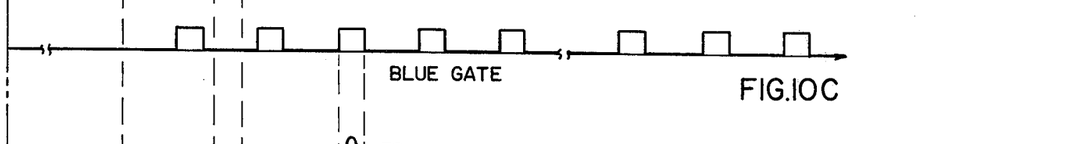
Figure 10D:
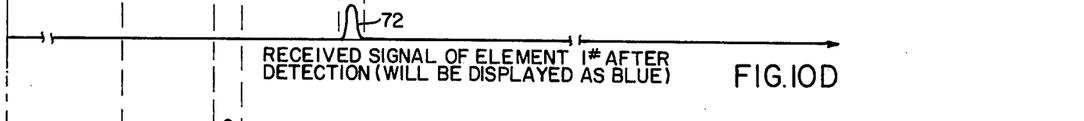
Figure 10E:
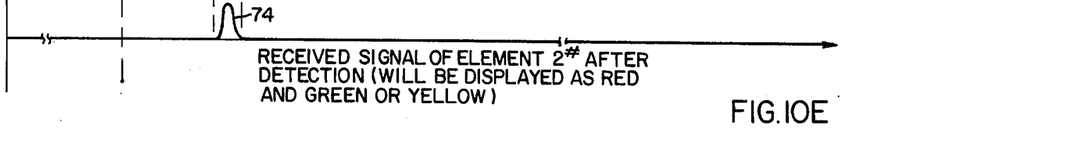

The present invention not only can be utilized for target detection and imaging, but the concept may be expanded to provide or contour information through the use of color. Very basically, with the speed of sound in water assumed to be 5000 feet per second, a 33.3 microsecond pulse width represents one inch of range. Utilizing a conventional color tube with the three primary colors red, green and blue, each output signal from the receiving transducers may be examined in 33.3 microsecond intervals to determine if a returned signal is present. By way of example, FIGS. 10A, B and C illustrate typical waveforms and timing relationships for red, blue and green gating respectively. Each gating pulse is 33.3 microseconds wide and the fundamental frequency of the waveform is 10 kilohertz. The waveform of 10D represents a received signal 72 (after amplication and detection). This received signal falls within the time duration of a blue gating and will accordingly be displayed as blue on the CRT color tube. Waveform 10E illustrates a received signal 74 falling within the time period of a portion of both the red gate signal and also the green gate signal and will accordingly be displayed as green and red so will appear yellow.

Figures 11, 12:
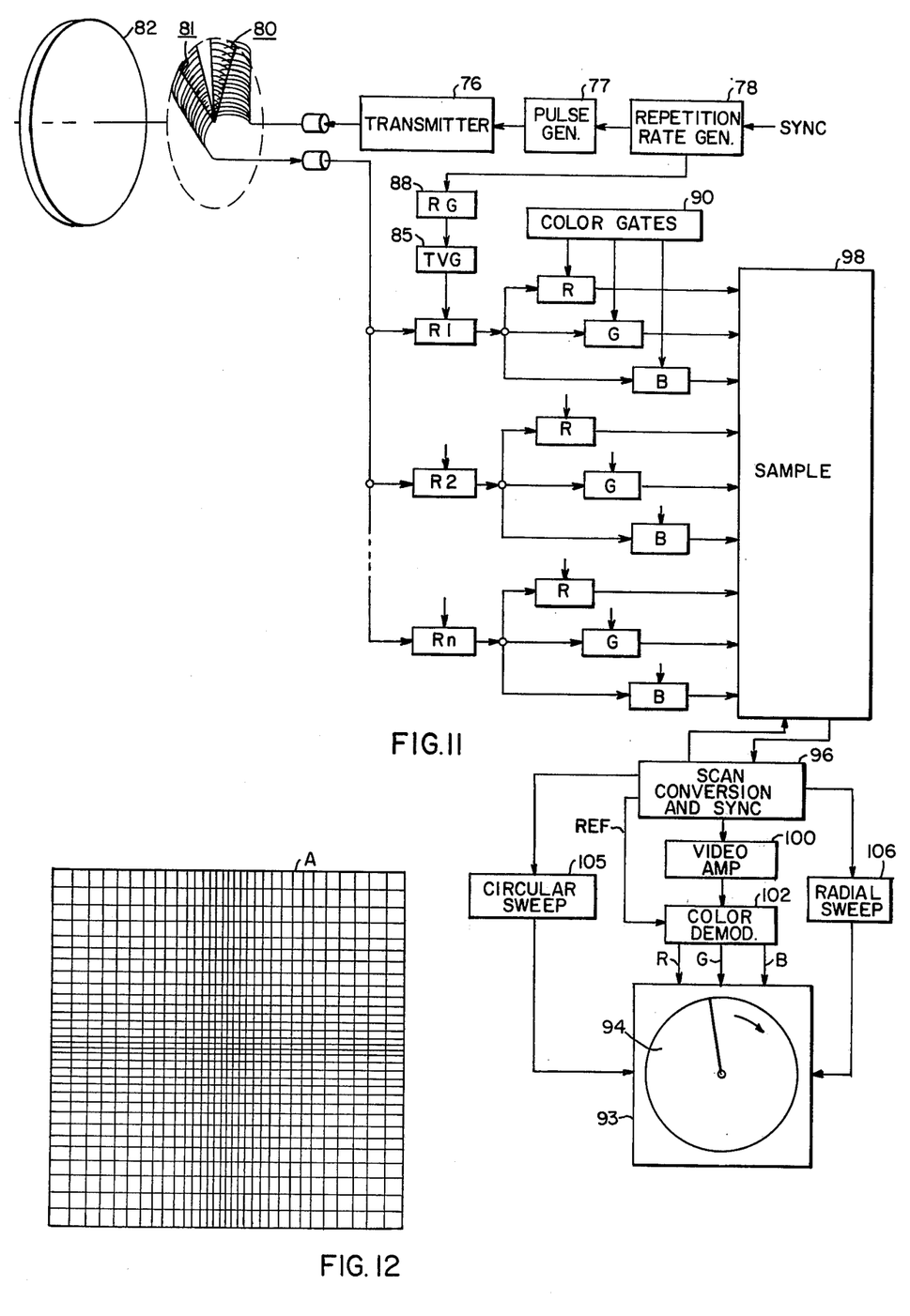
FIG. 11 illustrates, in block diagram, one embodiment for color ranging.
FIG. 12 illustrates a target area for an alternate embodiment of the present invention.

One arrangement which will accomplish the color display of range information is illustrated in block diagram form in FIG. 11. The transmitting portion of the apparatus is similar to FIG. 2 and includes a transmitter 76, pulse generator 77 and repetition rate generator 78 all for supplying the transmitting transducer array 80, as previously described. Acoustic energy received by receiving transducer array 81 through lens 82 is, as before, supplied to a plurality of receiving channels R1 to Rn, n being 31. The channels, as before, receive a time varying gain signal from the time varying gain generator 85 which is switched on, by means of a signal from a range gate signal 88 so that only signals returned from the general range of interest will be processed. If desired, this range gate which preferably is adjustable, may be operated in response to an output signal from the repetition generator 78.

A color gate circuit 90 provides the signals illustrated by waveforms 10A, B and C to respective gates designated R, G and B (red, green and blue). A set of RG and B gates is provided for each receiving channel R1 to Rn so that if and when a signal appears, it will pass through either the R gate, green gate, blue gate, or combinations thereof as previously described.

The display 93 includes a conventional three-gun TV tube 94 with the arrangement being preferably operated at conventional TV rates. Accordingly, storage means or scan conversion apparatus 96 is provided for storing the relatively slow rate signals of the sonar system and converting them to the faster rate signals for TV presentation. The sample circuit 98 scans the output signal from the R, G and B gates and passes any returned signals in the appropriate color time slot to the scan conversion apparatus. This operation is repeated after each acoustic transmission until an entire picture representation is stored whereupon the apparatus will provide an output signal to video amplifier 100, and then to a color demodulator which provides the red, green and blue color signals to the cathode ray tube apparatus. A reference signal is provided from the scan converter for demodulating the video signal.

In one embodiment the scan conversion apparatus may be a conventional rotating magnetic video disk. Such disks and controls therefore are well known to those skilled in the art and often include a synchronizing track. Accordingly, the scan conversion apparatus may be utilized to synchronize the sampling rate as well as other circuits including the circular sweep circuit 105 and radial sweep circuit 106.

Although not illustrated, delay circuits may be added at the output of each receiving transducer to compensate for the greater distance to the target area as a function of the field of view angle. With such appropriate delays therefore a flat bottom for example would appear on the display as a single color.

Although a circular scan has been described, a type of variable resolution can be obtained with a rectangular scan by using nonuniform spacing of elements and a non-linear sweep rate. The target area A for such a system is illustrated in FIG. 12 wherein the resolution is greatest in the center of the area and decrease toward the perpiphery thereof.

A relatively low resolution was used in the example in order to simplify the illustrations. It will be evident to those versed in the art that greater angular and radial resolutions are practical.

The examples were for sonic cameras operating in water but the same principles can be applied to cameras operating using electromagnetic energy in the visible or microwave frequency bands by using appropriate transducers, lenses, and frequencies.

The illustrations employed transmissive type lenses for focusing of energy but reflective types of lenses can also be employed.

The graded resolution concept can also be employed to achieve imaging when no lens is used, by using a digital or analog processing system such as described in application Ser. No. 416,326 filed Nov. 15, 1973, now U.S. Pat. No. 3,899,767 assigned to the same assignee as the present invention, to derive an image.

In the examples given to the projector insonified only a small portion of the area to be imaged on any one pulse because the array of receiving transducers were only receiving energy from a narrow radial segment of this area. A projector could be used with no lens that insonified the entire circular area to be imaged but this would require much more peak power and average power to achieve a reasonable signal to noise ratio.

What is claimed is:

1. An imaging system comprising:
 a. a plurality of receiving elements for receiving energy from a field of view;
 b. said elements being operable to provide corresponding output signals upon receipt of said energy;
 c. means for processing and displaying said signals as a picture of said field of view;
 d. said elements being oriented relative to one another and said means for processing being operable to provide for relatively high resolution at the center of said field of view and reduced resolution away from said center.

2. Apparatus according to claim 1 wherein said means for processing and displaying include:
 a. a display operable to display different colors;
 b. circuit means for determining the time of arrival of returned energy to correspond to different colors for providing a plurality of signals indicative of range increments; and
 c. circuit means for providing said signals to said display.

3. An imaging system for imaging a target region, comprising:
 a. transmitter means for projecting energy onto said target region;
 b. receiver means including a plurality of receiver elements radially arranged along a carrier and being responsive to energy returned from said target region to provide corresponding output signals;
 c. means for rotating said radially arranged receiver elements about an axis;
 d. a lens system for focusing said returned energy onto said elements;
 e. said elements being radially non-uniformly arranged so as to receive said returned energy from resolution areas of varying spacing on said target region, and
 f. means for processing said output signals.

4. Apparatus according to claim 3 wherein:
 a. said energy projected is acoustic energy.

5. Apparatus according to claim 3 wherein:
 a. said transmitter means includes a plurality of transmitting elements.

6. Apparatus according to claim 5 wherein:
 a. said transmitting elements are positioned behind a lens.

7. Apparatus according to claim 6 wherein:
 a. said transmitting and receiving elements are positioned behind a common lens.

8. Apparatus according to claim 3 wherein:
 a. said transmitter means operates in repetitive transmissions;
 b. for each said transmission only a portion of said target region receives said energy;
 c. said transmitter means being operable to cover successive portions of said target region with successive ones of said tansmissions.

9. Apparatus according to claim 8 wherein:
 a. adjacent touching areas of said target region receive said energy upon successive transmissions.

10. Apparatus according to claim 8 wherein:
 a. separated areas adjacent touching areas of said target region receive said energy upon successive transmissions to provide for an interlace operation.

11. Apparatus according to claim 3 wherein:
 a. said resolution areas define a circular array;
 b. said resolution areas in the vicinity of the center of said array being of substantially equal size;
 c. the remainder of said resolution areas being of relatively larger size.

12. Apparatus according to claim 11 wherein:
 a. said remainder of said resolution elements being of a size which increases with increasing radial distance from said center.

* * * * *